United States Patent [19]

Yeh

[11] Patent Number: 5,597,592
[45] Date of Patent: *Jan. 28, 1997

[54] MIDDLE SOLE SLOPING MACHINE WITH LENGTH/HEIGHT ADJUSTABLE ROLLS

[76] Inventor: Tien-fu Yeh, No. 53, Alley 87, Lane 538, Sec. 4, An Ho Rd., Tainan, Taiwan

[21] Appl. No.: 558,026

[*] Notice: The term of this patent shall not extend beyond the expiration date of Pat. No. 5,364,257.

[22] Filed: Nov. 13, 1995

Related U.S. Application Data

[63] Continuation-in-part of Ser. No. 292,493, Aug. 18, 1994, Pat. No. 5,505,605, which is a continuation-in-part of Ser. No. 133,620, Oct. 7, 1993, Pat. No. 5,364,257.

[51] Int. Cl.$^6$ .......................... B29C 53/00; B29C 43/46; B29D 7/00
[52] U.S. Cl. ..................... 425/367; 100/168; 425/363; 425/368
[58] Field of Search ..................... 425/363, 366, 425/367, 368, DIG. 127; 100/93 RP, 168, 171, 176

[56] References Cited

U.S. PATENT DOCUMENTS

| | | |
|---|---|---|
| 1,114,572 | 10/1914 | Barcus ..................................... 425/368 |
| 3,670,644 | 6/1972 | Hoever et al. ........................... 100/168 |
| 3,856,462 | 12/1974 | Mueller ................................... 100/168 |
| 3,871,808 | 3/1975 | Ancker .................................... 425/368 |
| 4,171,942 | 10/1979 | Missenard ............................... 425/367 |
| 5,061,337 | 10/1991 | Fraser ..................................... 425/367 |
| 5,364,257 | 11/1994 | Yeh ......................................... 425/363 |

*Primary Examiner*—James P. Mackey
*Attorney, Agent, or Firm*—Hamilton, Brook, Smith & Reynolds, P.C.

[57] ABSTRACT

A middle sole sloping machine includes a base plate, upper and lower roll assemblies each including a first and second rolls separated from each other and an elastomeric sloping section fixedly attached to one of the rolls, a fixed mount plate and a movable mount plate extending upward from the base plate, the movable mount plate being movable relative to the fixed mount plate in a direction parallel to the extending direction of the roll assemblies, a first device for effecting relative movements between the fixed and movable mount plates along the extending direction of the roll assemblies, a second device for effecting vertical movements of the first and second rolls of the roll assemblies, a third device for rotating the roll assemblies, a controller mounted to each of the first and second devices, and a control box electrically connected to the controllers to provide an automatic control for adjustments of the rolls.

8 Claims, 6 Drawing Sheets

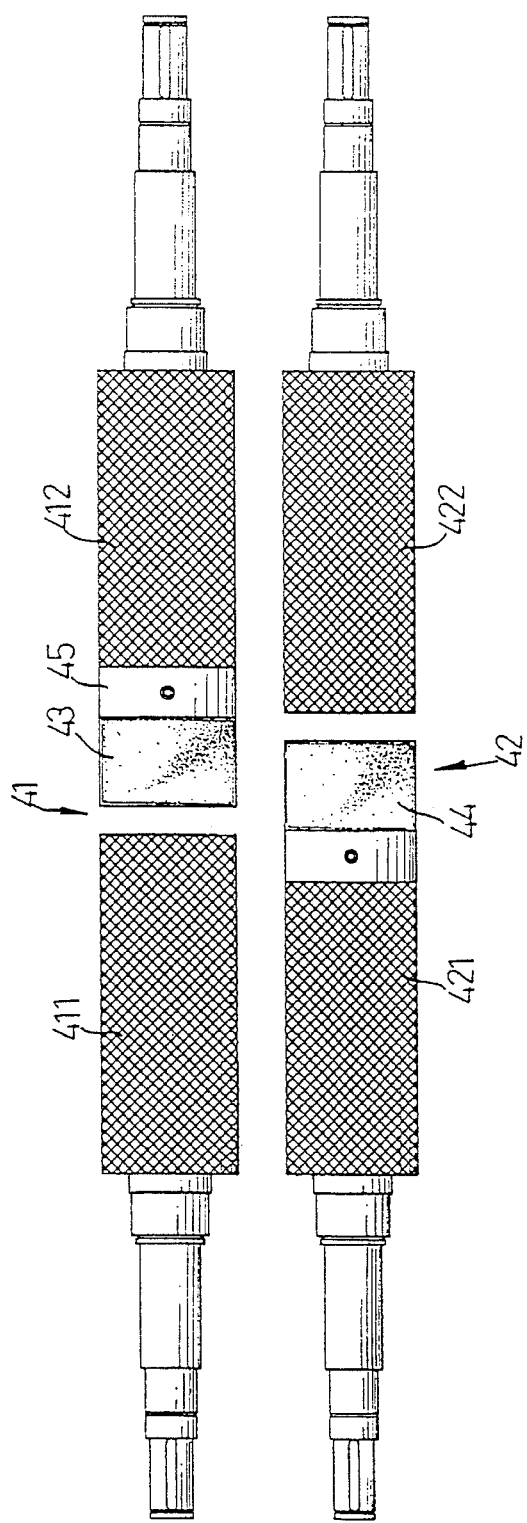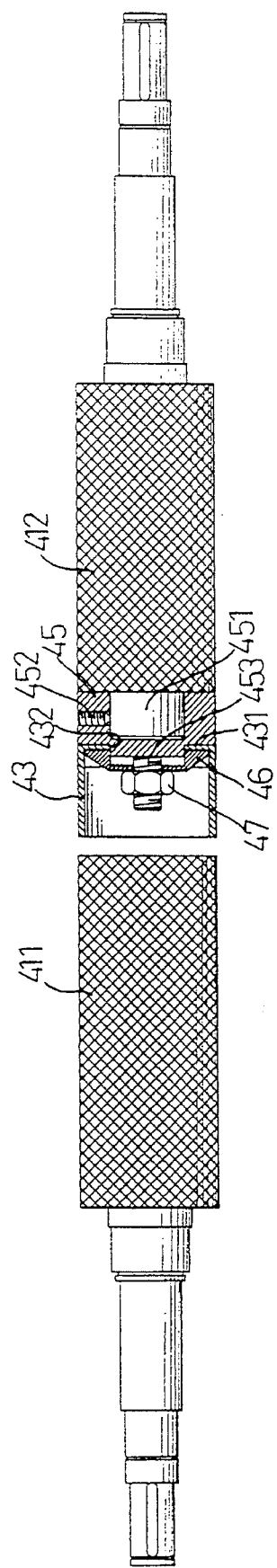

MIDDLE SOLE SLOPING MACHINE WITH LENGTH/HEIGHT ADJUSTABLE ROLLS

CROSS-REFERENCE TO RELATED APPLICATION

This application is a continuation-in-part of U.S. patent application Ser. No. 08/292,493, filed Aug. 18, 1994, now U.S. Pat. No. 5,505,605, issued on Apr. 9, 1996, which is a continuation-in-part of U.S. patent application Ser. No. 08/133,620, filed Oct. 7, 1993, now U.S. Pat. No. 5,364,257, issued on Nov. 15, 1994.

FIELD OF THE INVENTION

The present invention is related to a middle sole sloping machine, particularly, to an improvement for the rolls of the machine.

BACKGROUND OF THE INVENTION

Conventionally, manufacturers must produce dozens of correspondingly shaped roll pairs due to the diversification of the dimensions of the middle soles. Applicant's U.S. patent application Ser. No. 08/133,620 disclosed a middle sole sloping machine including a pair of rolls respectively incorporating a spring so that the lengths and heights of which can be adjusted. Applicant's U.S. patent application Ser. No. 08/292,493 provided an improved design to give an automatic control for such adjustment.

Although the Applicant's above said two prior inventions are proved to be able to function well, they still need an improvement concerning the rolls.

Refer to FIGS. 9 and 10 which respectively show a pair of rolls for the Applicant's said two prior inventions and a middle sole 62 obtained by cutting a blank 60 rolled by the prior rolls. The pair of rolls include an upper roll 80 and a lower roll 90. The upper roll 80 includes a left roll section 81, a right roll section 82 and a spring 83 connected therebetween. Similarly, the lower roll 90 includes a left roll section 91, a right roll section 92 and a spring 93 connected therebetween. When the rolls 80 and 90 are rotated to roll the blank 60 for production of the middle sole 62, since each of the springs 83, 93 is formed by a plurality of continuous coils, the pressure points for which each spring exerts a pressure on the blank 60 will be laterally shifted following the passing of the blank 60 through the rolls 80, 90. Such a shift of pressure points will cause the rolled blank 60 to be irregularly laterally extended, which, in turn, will result in that the middle sole 62 (FIG. 10) obtained by cutting the rolled blank 60 will also have an irregular shape, rather than a generally rectangular shape. Such an irregular shape of the middle sole 62 will adversely affect the quality of the shoe incorporating the middle sole 62.

The present invention is disclosed to improve the structure of the pair of rolls to mitigate and/or obviate the above-mentioned problems concerning the Applicant's '620 and '493 patent applications.

SUMMARY OF THE INVENTION

The present invention provides a middle sole sloping machine which includes a base plate, upper and lower roll assemblies each including first and second rolls separated from each other a distance, the first and second rolls respective of the upper and lower roll assemblies including an elastomeric sloping section positioned near the other roll, a fixed mount plate and a movable mount plate being movable relative to the fixed mount plate in a direction parallel to the extending direction of the upper and lower roll assemblies, a first device for effecting relative movement between the fixed and movable mount plates along the extending direction of the upper and lower roll assemblies thereby changing the separated distance between the first and second rolls, a second device for effecting vertical movements of the first and second rolls of the upper and lower roll assemblies thereby changing the thicknesses of both ends of the middle sole, and a third device for rotating the upper and lower roll assemblies.

Controllers, such as decoders, counters and photodetectors are provided to the first and second devices and a control box is electrically connected to the controllers, thereby providing automatic control of the adjustment of the roll assemblies.

By such an arrangement, the relative position of the first and second rolls in a corresponding roll assembly is horizontally and vertically adjustable to form middle soles of various dimensions.

Furthermore, since the sloping sections are made of an elastomeric material (for example, Polyurethane) and arranged generally diagonally on inner ends respective of the first and second rolls respective of the upper and lower roll assemblies, when the roll assemblies are operated to roll the blank for the middle sole, the sloping sections will exert a uniform pressure on the blank thereby to obtain a middle sole having a generally rectangular shape.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 3 is a front elevational view showing a pair of roll assemblies in accordance with the present invention;

FIG. 4 is a front elevational view of the upper roll assembly of FIG. 3 in a slightly large scale, with a part being cut away to show the details that a sloping section of the present invention is attached to an inner end of the right roll of the roll assembly;

DETAILED DESCRIPTION OF THE PREFERRED EMBODIMENT

Figure 1:
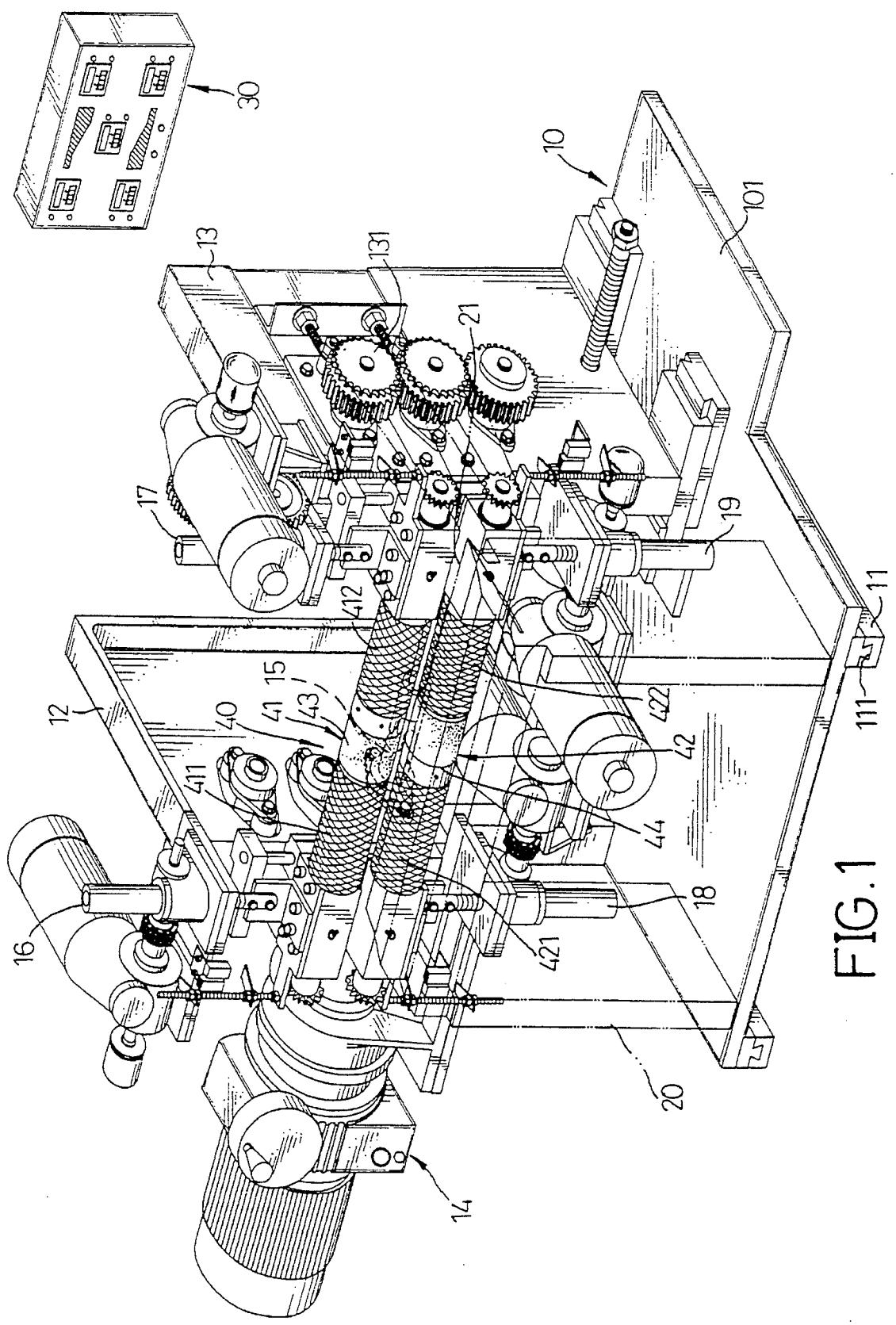
FIG. 1 is a perspective view showing a middle sole sloping machine in accordance with the present invention.

Referring to FIG. 1, a pair of roll assemblies generally indicated by reference number 40 are mounted on a middle sole sloping machine. Although the structure and operation of the middle sole sloping machine can be readily understood by referring to the Applicant's above said U.S. patent application Ser. Nos. 08/133,620 and 08/292,493, a brief discussion concerning the relationship between the roll assemblies and the machine will be given below.

Still referring to FIG. 1, the machine includes a movable base assembly 10, a cutter seat 20 (indicated by phantom lines) mounted in front of the base assembly 10, a belt type endless cutter 21 being mounted on the cutter seat 20 which is used to cut a blank for forming a middle sole. The blank is fed from a rear side of the machine to move toward a front side thereof in which the blank is rolled by the roll assemblies 40, and, then, cut by the cutter 21.

Figure 2:
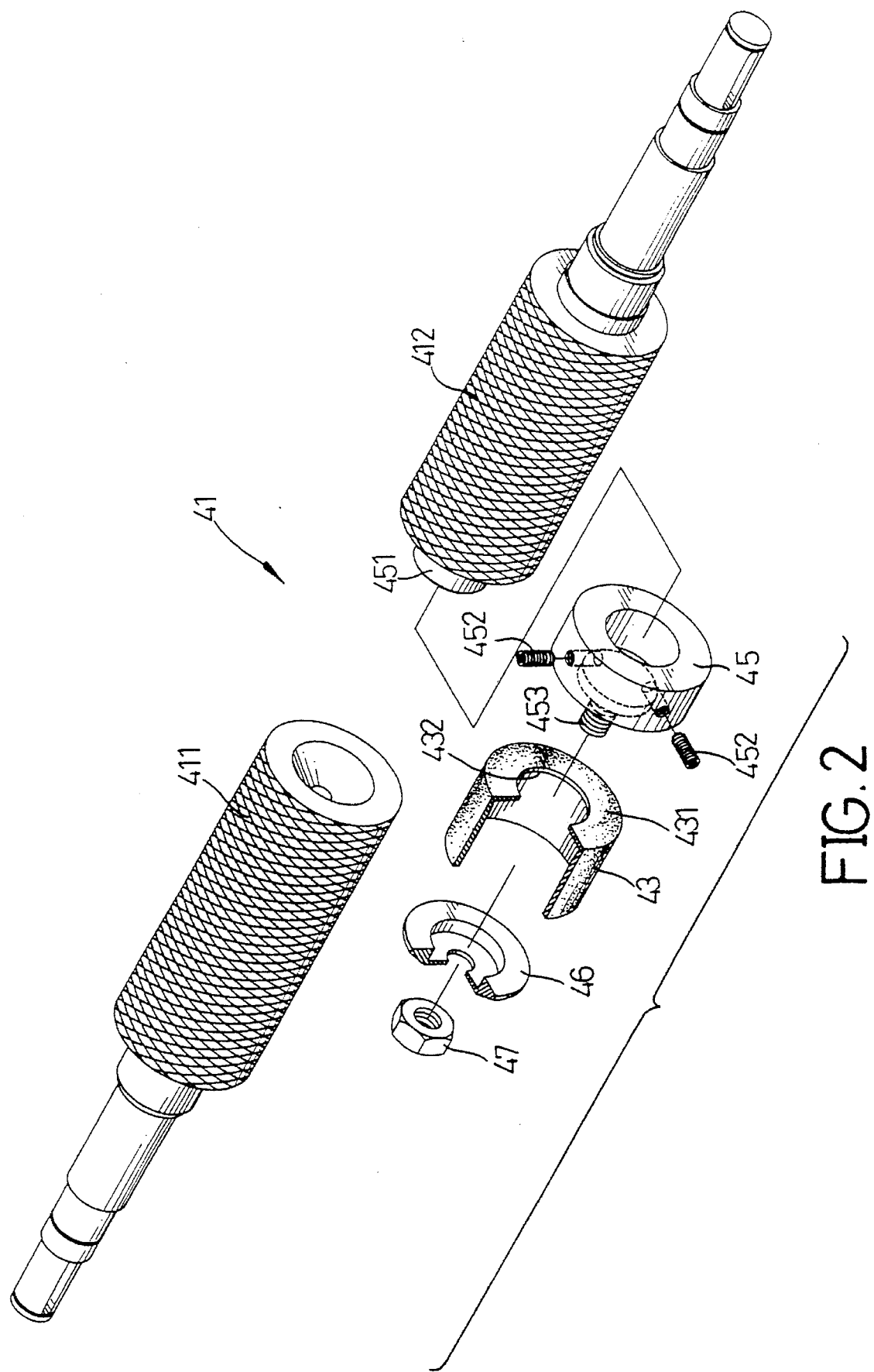
FIG. 2 is a perspective, exploded view showing the elements constituting a roll assembly in accordance with the present invention.

Also referring to FIG. 2, the roll assemblies 40 include an upper roll assembly 41 including a left roll 411 and a right roll 412 separated from each other, and a lower roll assembly 42 including a left roll 421 and a right roll 422 separated from each other.

Back to FIG. 1, the movable base assembly 10 includes a base plate 101 which is movable relative to a fixed frame by provision of a dovetail track means consisting of a pair of spaced first track members 111 on an underside of the base plate 101 and a pair of correspondingly shaped second track members 11 mounted on the frame, whereby the distance between the cutter 21 and the roll assemblies 40 is adjustable.

A fixed mount plate 12 and a movable mount plate 13 extend upward from an upper side of the base plate 101. The mount plate 13 is movable relative to the fixed mount plate 12.

A driving means 14 is used to drive a rotation of the left rolls 411 and 421 respective of the roll assemblies 41, 42, wherein the left rolls 411 and 421 are mounted on the fixed mount plate 12. Furthermore, the driving means 14 can activate an operation of a gear set 131 through a coupling means 15. The gear set 131 is used to drive a rotation of the right rolls 412 and 422 respectively of the roll assemblies 41 and 42 wherein right rolls 412 and 422 are mounted on the movable mount plate 13. Each of the rolls 411, 412, 421 and 422 is drivably connected to each of elevator means 16, 17, 18 and 19 so that the vertical positions respective of the rolls 411, 412, 421 and 422 are adjustable.

Since the vertical positions respective of the rolls 411, 412, 421 and 422 are adjustable and the movable plate 13 wherein the rolls 412 and 422 are mounted can be moved toward or away from the fixed plate 12 wherein the rolls 411 and 421 are mounted, the relative positions between the rolls 411, 412, 421 and 422 can be varied to form middle sole of various dimensions.

Controllers, such as decoders, counters and photodetectors (not labeled) are provided to the elevator means 16, 17, 18 and 19 and a driving means (not shown) for effecting the movement of the movable mount plate 13 relative to the fixed mount plate 12. A control box 30 is electrically connected to the controllers, thereby providing automatic control of the adjustment of the roll assemblies 40.

Thereafter, we will discuss the improvement concerning the structure of the upper and lower roll assemblies 41 and 42. Referring to FIG. 3, a left end of the right roll 412 of the upper roll assembly 41 is provided with an elastomeric sloping section 43; similarly, a right end of the left roll 421 of the lower roll assembly 42 is provided with an elastomeric sloping section 44. However, in an alternative embodiment, the positions of the elastomeric sloping sections 43 and 44 can be changed, i.e., to attach the sloping section 43 on the right end of the left roll 411 of the upper roll assembly 41 and the sloping 44 on the left end of the right roll 422 of the lower roll assembly 42. Each of the sloping sections 43 and 44 is made of an elastomeric material, for example, Polyurethane. The sloping sections 43 and 44 can be attached to their corresponding rolls by a variety of manners. FIG. 2 shows a preferred embodiment.

Referring to FIGS. 2, 3 and 4, the sloping section 43 for the upper roll assembly 41 is formed to have a cup shape having a bottom wall 431 with a hole 432 extending therethrough. A left end of the right roll 412 is provided with a protrusion 451 which is used to engage a circular attachment 45 defining a hole at a rear portion thereof. The left end of the right roll 412 is extended toward a central of the machine (better seen in FIG. 1). The attachment 45 is used to mount the sloping section 43 onto the right roll 412. Two set screws 452 are used to extend through two threaded holes defined in a periphery wall of the attachment 45 to fixedly engage the attachment 45 with the protrusion 451. A threaded rod 453 is extended from a front end face of the attachment 45. The threaded rod 453 extends through the hole 432 defined by the bottom wall 431 of the sloping section 43 and a washer 46 and finally threadedly engaged with a nut 47, whereby the nut 47 can exert a screwing force to fixedly connect the washer 46, the sloping section 43 and the attachment 45 together. The outer diameters of the roll 412, the attachment 45 and the sloping section 43 are the same. Due to the special structure of the sloping section 43 that is hollow, the sloping section 43 can be deformed when it is subjected to a pressure. Furthermore, since the nature of the Polyurethane that is semi-rigid, the sloping section 43 can exert a certain amount of pressure on the blank for producing the middle sole. A right end of the right roll 412 is used to be mounted on the movable mount plate 13.

Although the above disclosures are related to the upper roll assembly 41, it can be appreciated by those skilled in the art that these disclosures can be also applied to the lower roll assembly 42 to construct its corresponding sloping section 44 and mount the sloping section 44 on the left roll 421 thereof.

Now particularly referring to FIG. 3, when the present machine is not operated to roll the blank for producing a middle sole, all of rolls 411, 412, 421 and 422 are returned to their respectively neutral positions wherein the upper roll assembly 41 is horizontally parallel to the lower roll assembly 42. The right roll 412 of the upper roll assembly 41 is positioned diagonally to the left roll 421 of the lower roll assembly 42. The left roll 411 of the upper roll assembly 41 is positioned diagonally to the right roll 422 of the lower roll assembly 422.

Figure 5:
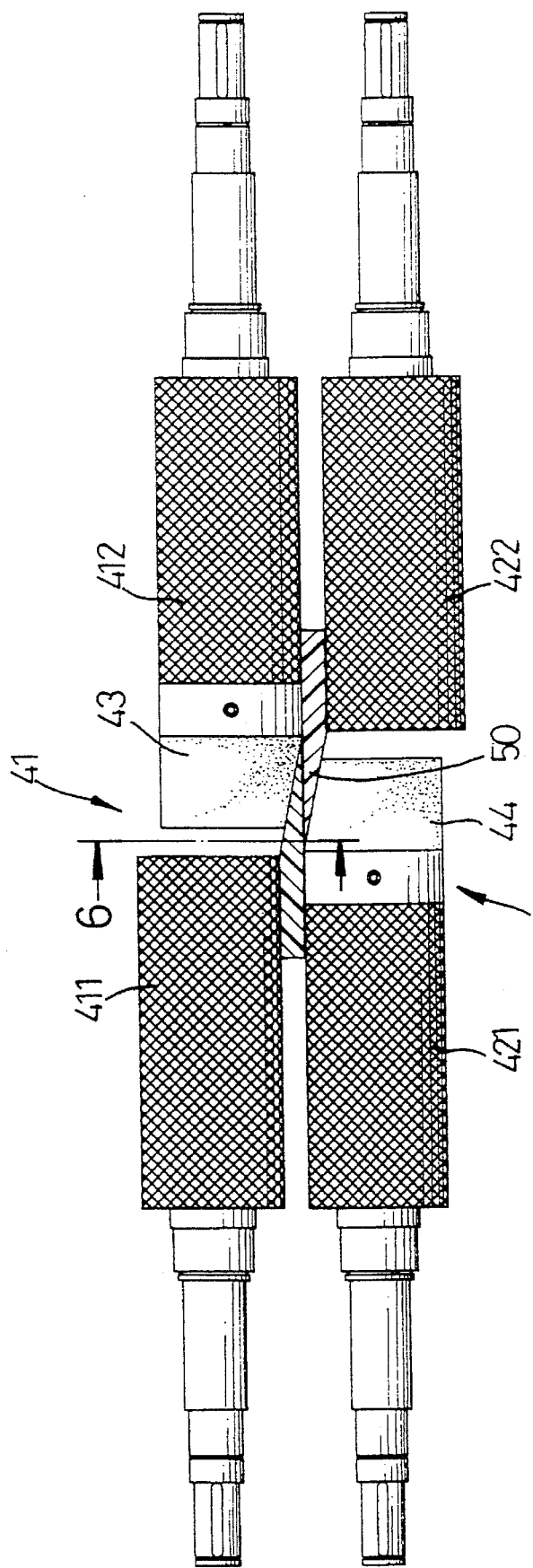
FIG. 5 is a front elevational view showing the roll assemblies are used to roll a blank for a "semi-insert" type middle sole, wherein the blank is shown by a cross-sectional manner.
Figure 8:
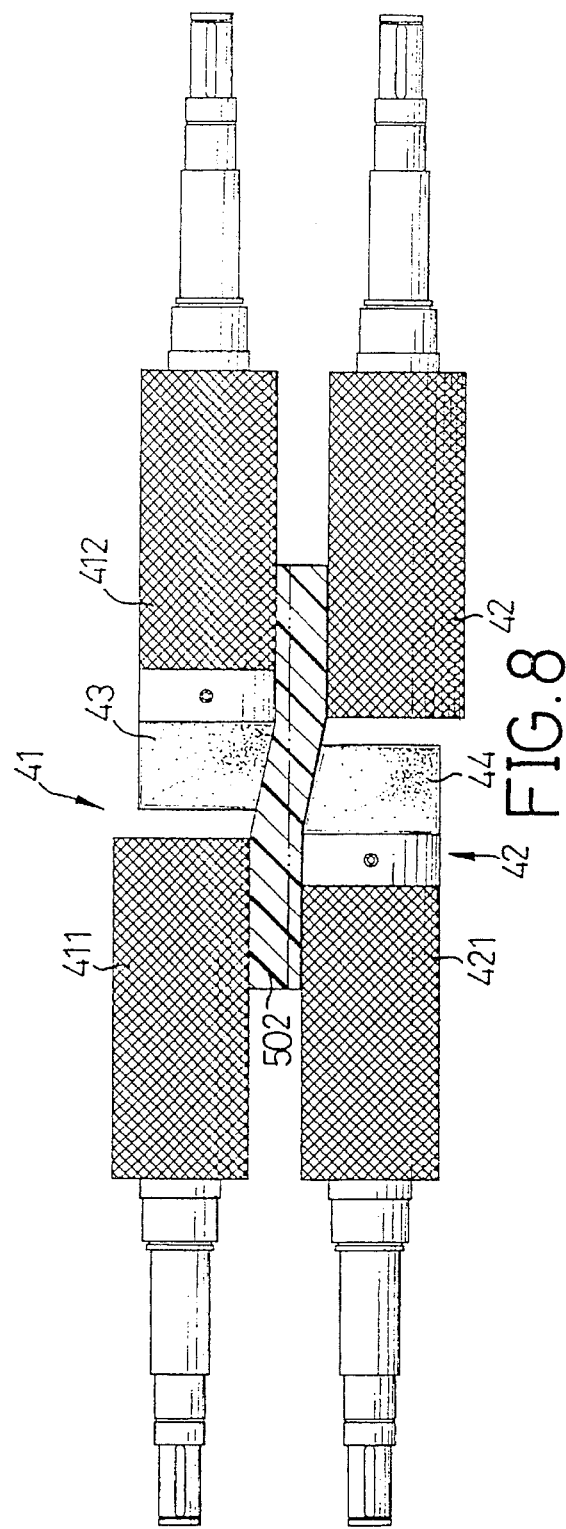
FIG. 8 is a view similar to FIG. 5 but showing that the roll assemblies are used to roll a blank for a "full-insert" type middle sole.
Figure 9:
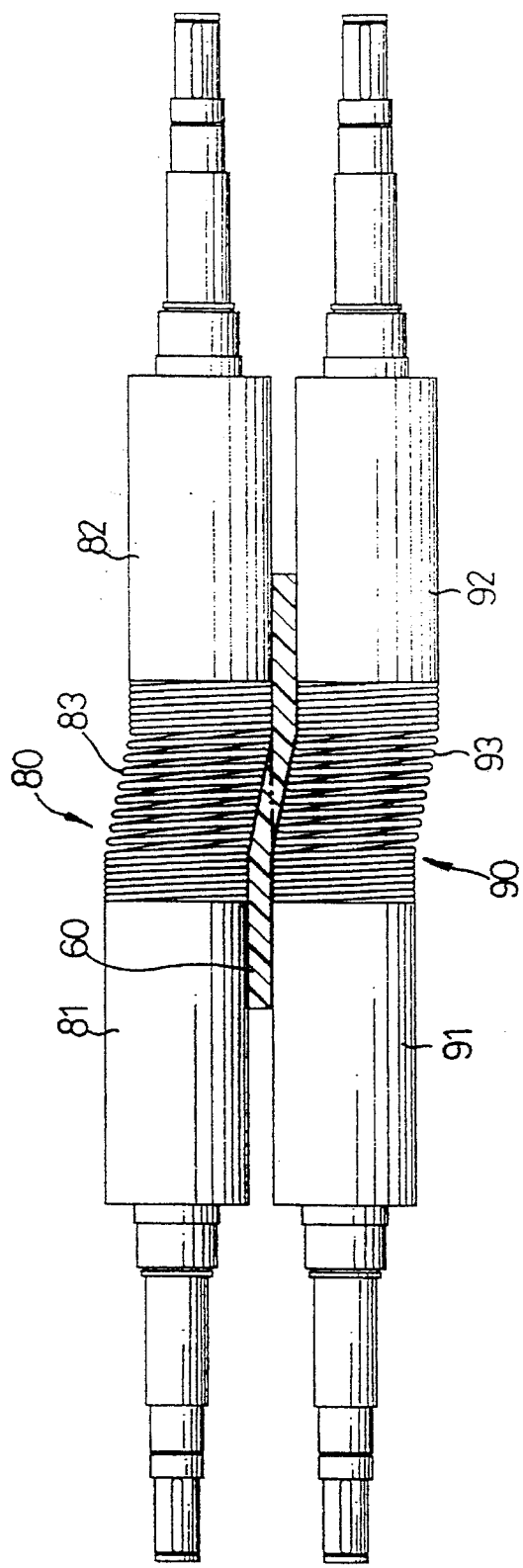
FIG. 9 is a view similar to FIG. 5 but showing that a pair of prior art rolls are used to roll a blank for a "semi-insert" type middle sole.
Figure 10:
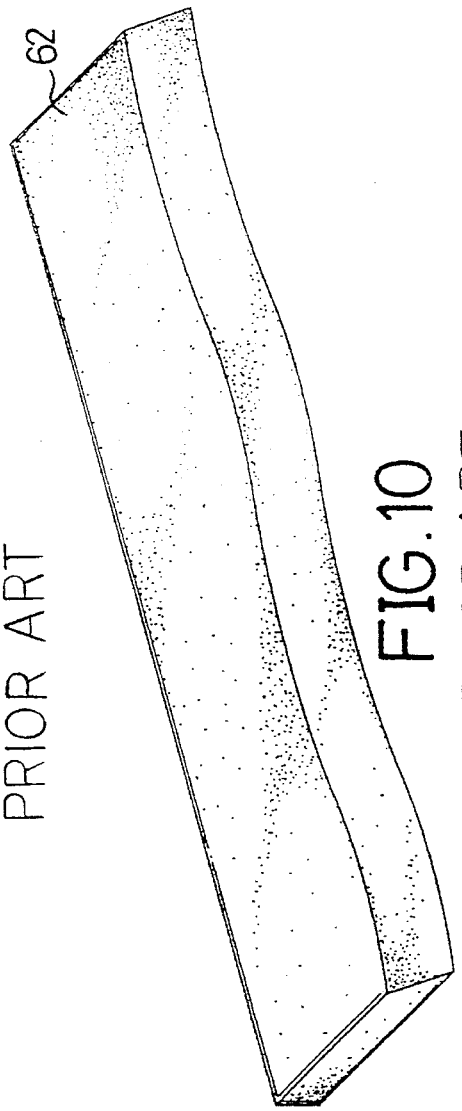
FIG. 10 is a perspective view showing a middle sole obtained from the roll assemblies of FIG. 9.

When the present machine is operated to roll the blank for producing a middle sole, firstly, the control box 30 is manipulated to drive the rolls 411, 412, 421 and 422 to predetermined positions, for example, as those shown in FIG. 5. Then, a blank 50 is fed from the rear side as viewed from FIG. 1 to enter into the present machine. When the blank 50 is transported to pass through the roll assemblies 41, 42, it will be rolled by the rolls 411, 412, 421 and 422. When the roll assemblies are set to roll the blank 50 to obtain a "semi-insert" type middle sole as shown in FIG. 5, the right rolls 412 and 422 are lowered a distance so that the bottom edge of the roll 412 is aligned with the top edge of the left roll 421 of the lower roll assembly 42. When the roll assemblies are set to roll a blank 502 to obtain a "full-insert" type middles sole as shown in FIG. 8, the right rolls 412 and 422 are lowered a distance shorter than that for the "semi-insert" middle sole.

Figure 6:
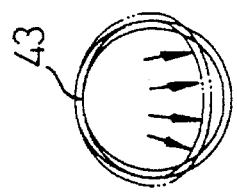
FIG. 6 is a view as viewed from line 6—6 of FIG. 5.

During the rolling of the blank 50, two end portions thereof are pressed by the rolls 411, 412, 421 and 422, and an intermediate portion is pressed by the sloping sections 43 and 44, wherein the sloping sections 43 and 44 are deformed while exerting a pressure on the intermediate portion of the blank 50. For example, as shown by FIG. 6, during the rolling of the blank 50, the sloping section 43 is deformed from the solid lines to the phantom lines while exerting a pressure as indicated by the arrows on the intermediate portion of the blank 50.

Figure 7:
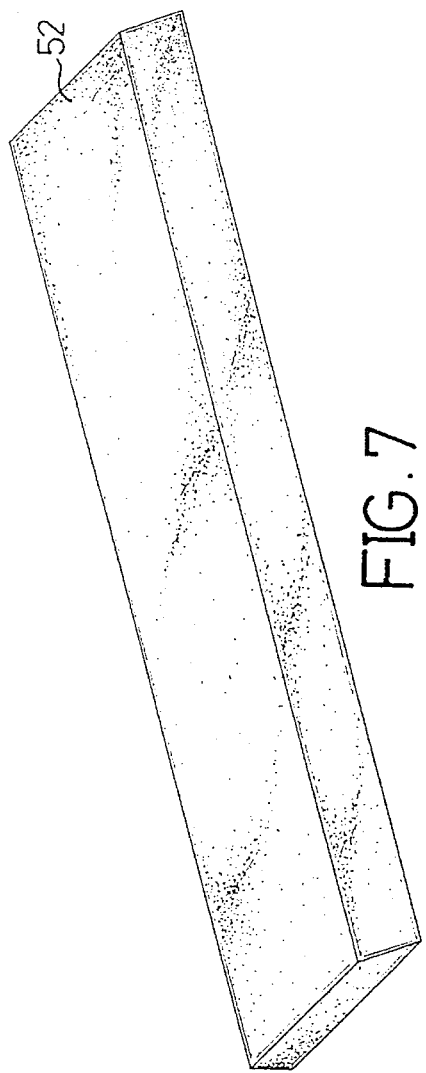
FIG. 7 is a perspective view showing a middle sole obtained from the roll assemblies of FIG. 5.

Since during the rolling of the blank 50, unlike the coils of the springs used in the prior art '620 and '493 applications, which will have a lateral movement toward or away from each other, the sloping sections 43 and 44 substantially will not have a lateral movement so they can more uniformly press the blank 50, thereby obtaining a "semi-insert" type middle sole 52 with a uniformly rectangular shape as shown in FIG. 7.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A middle sole sloping machine, comprising:

a base plate, upper and lower roll assemblies each comprising first and second rolls separated from each other and an elastomeric sloping section fixedly attached to one of the rolls;

a fixed mount plate and a movable mount plate extending upward from the base plate, the movable mount plate being movable relative to the fixed mount plate in a direction parallel to the extending direction of the upper and lower roll assemblies, the first rolls being movably attached to the fixed mount plate, the second rolls being movably attached to the movable mount plate;

a first means for effecting relative movements between the fixed and movable mount plates along the extending direction of the upper and the lower roll assemblies;

a second means for effecting vertical movements of the first and second rolls of the upper and lower roll assemblies; and a third means for rotating the upper and lower roll assemblies.

2. A middle sole sloping machine in accordance with claim 1 wherein the first roll of the upper roll assembly is positioned substantially diagonally to the second roll of the lower roll assembly and wherein the elastomeric sloping sections are respectively mounted on the second and first rolls respective of the upper and lower roll assemblies.

3. A middle sole sloping machine in accordance with claim 2 wherein each of the first and second rolls comprises an outer end attached on its corresponding mount plate and an inner end extending toward a center of the machine, said sloping sections being attached to the inner ends of the second and first rolls respective of the upper and lower roll assemblies.

4. A middle sole sloping machine in accordance with claim 3, wherein the elastomeric sloping sections are formed to have a substantially cup shape with a bottom wall being attached to each of the rolls.

5. A middle sole sloping machine in accordance with claim 4 comprising means to attach the sloping sections to the rolls wherein each attaching means comprises a circular attachment fixedly attached to the inner end of the roll, a threaded rod extending from the attachment toward the center of the machine, a washer and a nut incorporating with the threaded rod to exert a force on the washer and then the bottom wall of the sloping section and finally the attachment to fixedly mount the sloping section onto the roll.

6. A middle sole sloping machine in accordance with claim 5 wherein the outer diameters of the rolls, the attachments and the sloping sections are substantially the same.

7. A middle sole sloping machine in accordance with claim 6, wherein the sloping sections are formed of Polyurethane.

8. A middle sole sloping machine in accordance with claim 1 further comprising a controller mounted to the first and second means and a control box electrically connected to the controllers, thereby providing automatic control of the adjustment of the roll assemblies.

\* \* \* \* \*